Nov. 10, 1964    A. A. BERG    3,156,330
CYLINDER ATTACHING STRUCTURE
Filed Jan. 18, 1961

INVENTOR.
Arthur A. Berg,
BY Parker & Carter
Attorneys.

United States Patent Office 3,156,330
Patented Nov. 10, 1964

3,156,330
CYLINDER ATTACHING STRUCTURE
Arthur A. Berg, Lincolnwood, Ill., assignor to Berg Airlectro Products Co., Chicago, Ill., a corporation of Illinois
Filed Jan. 18, 1961, Ser. No. 83,477
2 Claims. (Cl. 189—36)

This invention relates to securing means and has particular relation to means for securing thin-walled metal structures to supports therefor.

One purpose is to provide means for securing a member having an end wall and side walls formed of thin metal to a support for said member.

Another purpose is to provide a means for transferring the thrust of securing elements from an end wall to a side wall of a thin-walled metal structure.

Another purpose is to provide a means for distributing the thrust of a fastener member between an end wall and a side wall of a metal structure.

There are a number of instances in which a member having an end wall and a cylindrical or rectangular side wall or walls formed of relatively thin metal which must be secured to various supporting structures. In many such instances, the entire assembly is subjected in use to substantial vibration and stress. Fasteners intended to secure the end wall of such structures to supporting members have been known to have been pulled through the apertures provided in such end wall for such fasteners resulting in deterioration or destruction of the thin-walled structure intended to be attached and supported. To make the walls of thicker material is often not permissible because of the additional weight and space penalties resulting. Accordingly, it is one purpose of the invention to provide a means enabling the continued use of thin-walled structures in environments subjecting such structures to vibration and stress.

Other purposes will appear from time to time during the course of the specification and claims.

Figure 1:
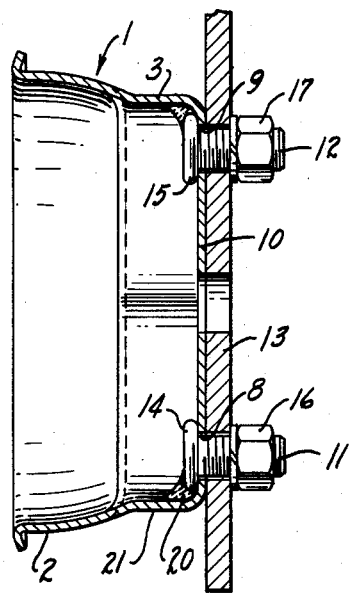
Figure 2:
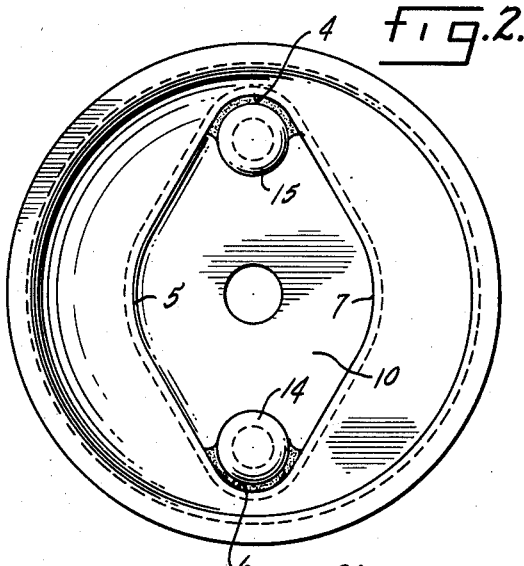
Figure 3:
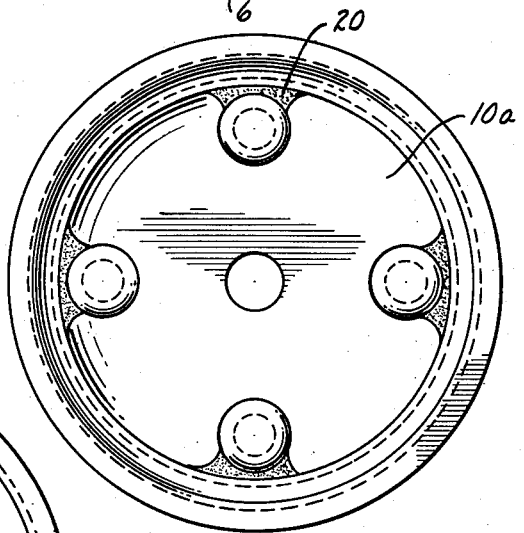
Figure 4:
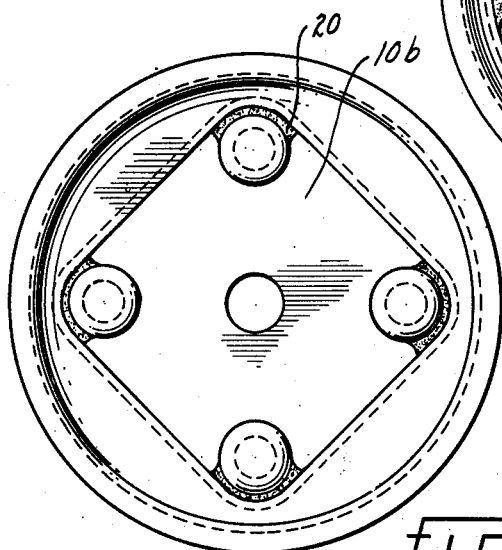

I illustrate my invention more or less diagrammatically in the accompanying drawings, wherein:

FIGURE 1 is a side view in partial cross section;
FIGURE 2 is an end view illustrating the invention employed with a structure having a particular form of end wall;
FIGURE 3 is an end view illustrating the invention employed with a structure having another form of end wall; and
FIGURE 4 is an end view illustrating the invention employed with a structure having still another form of end wall.

Like parts will be indicated by like numerals throughout the specification and drawings.

Referring now to the drawings, and particularly to FIGURE 1, the numeral 1 indicates generally a structure having walls formed of thin metallic material. The structure 1 may have a cylindrical portion 2, and a reduced trapezoidal end portion 3 having generally rounded corners 4, 5, 6 and 7, as best seen in FIGURE 2.

Apertures 8, 9 are formed in the end wall 10 of housing part or structure 1. Fasteners 11, 12 are passed through the apertures 8, 9, respectively, and through corresponding apertures in a support member 13. The fasteners 11, 12 have heads 14, 15, respectively, brought up against the inner surface of end wall 10 and nut elements 16, 17, respectively, brought up against the outer surface of support 13. It will be realized that the nut members 16, 17 and heads 14, 15 may be reversed in position without departing from the nature and scope of the invention. As best seen in FIGURE 2, the heads 14, 15 are arranged adjacent the corners 4, 6 of end wall 10.

As seen in FIGURES 3 and 4, the end wall 10 may take a variety of forms, for example, the circular form 10a illustrated in FIGURE 3, and the rectangular form 10b illustrated in FIGURE 4. In the latter figure, the four bolt or fastener heads are illustrated and should be considered substantially identical to the heads 14, 15 illustrated in FIGURES 1 and 2. Similarly, in FIGURE 3, four such fastener heads are arranged in circumferentially spaced relationship adjacent the periphery of end wall 10a.

Weldments are formed in securing contact with the fastener heads, such as the heads 14, 15, and extend to and are in securing contact with the longitudinally extending portions of the side wall of housing or structure 1, the weldments being indicated at 20, the longitudinally extending wall portions being indicated at 21. It will be understood that the side wall portions 21 are arranged substantially perpendicularly to the end wall 10 in whatever form the end wall and side walls should take. Similarly, while the weldments 20 are shown as securing the heads 14, 15 to the side wall or side walls illustrated, said weldments could be employed to secure the nut elements 16, 17 thereto without departing from the nature and scope of the invention.

The use and operation of my invention are as follows:
The weldments 20, being formed of suitable metallic weld material, are effective to secure the fastener heads or nuts to the perpendicularly extending walls 21. Thus, forces tending to pull the heads 14, 15 or nuts 16, 17 through the apertures 8, 9, for example, or, conversely, to pull the end wall 10 over the heads 14, 15, or nuts 16, 17, for example, are transferred, at least in sufficient part, to the perpendicularly extending wall portions 21 of structure 1. The weldments 20 are thus effective to place the perpendicular wall sections 21 in tension and to relieve the end wall 10 from a substantial portion of the force and thrust created by vibration and stress. Thus, forces tending to separate the end wall 10 from the fastener heads in contact therewith are directed toward the elongation of perpendicular wall sections 21, a much more difficult, if not impossible, task than the mere distortion of apertures 8, 9.

Whereas I have shown a preferred embodiment of the invention, the above description is intended to be illustrative only and not definitive. Accordingly, the scope of the invention should only be limited by the scope of the following appended claims.

I claim:
1. A thin-walled structure having an end wall and a wall perpendicular thereto, an aperture in said end wall and spaced from said perpendicular wall, a fastener extending through said aperture and having an enlarged element in contact with the inner surface of said end wall and out of contact with the inner surface of said perpendicular wall, a weldment secured to said element and to said perpendicular wall adjacent said end wall.

2. In combination, a thin wall structure having an end wall, an aperture in said end wall, a wall spaced from said aperture and extending perpendicularly to said end wall, and a fastener having a head in contact with an inner surface of said end wall about said aperture and spaced from the inner surface of said perpendicular wall, and a weldment secured to said head, to said end wall, and to said perpendicular wall, said fastener having a threaded extension secured to said head and extending through said end wall aperture.

References Cited in the file of this patent
UNITED STATES PATENTS

| | | |
|---|---|---|
| 1,709,163 | White | Apr. 16, 1929 |
| 2,193,680 | Weissert | Mar. 12, 1940 |
| 2,464,541 | Young | Mar. 15, 1949 |
| 2,603,855 | Vassaux | July 22, 1952 |
| 2,768,434 | Taylor | Oct. 30, 1956 |